May 28, 1957 C. R. STOUGH 2,793,913
DEVICE FOR SECURING ADJUSTABLE RIM ON WHEEL BODY
Filed Jan. 20, 1954 2 Sheets-Sheet 1

INVENTOR.
CHARLES R. STOUGH
BY
*Barnes, Kisselle, Laughlin & Raisch*
ATTORNEYS

INVENTOR.
CHARLES R. STOUGH

United States Patent Office 2,793,913
Patented May 28, 1957

2,793,913

DEVICE FOR SECURING ADJUSTABLE RIM ON WHEEL BODY

Charles R. Stough, Lansing, Mich., assignor to Motor Wheel Corporation, Lansing, Mich., a corporation of Michigan Application January 20, 1954, Serial No. 405,152

3 Claims. (Cl. 301—9)

This invention relates to a device for securing an axially adjustable rim to the body of a wheel.

Variable tread farm tractors are old, see Strehlow, 2,417,139, wherein the rim of each drive wheel has helical rail segments which are engaged by yokes on the wheel disc so that the rim and tire thereon may be axially adjusted by turning the rim and wheel disc or body relatively to each other and the rim is locked in adjusted position by rotatable cams which urge associated elements radially outwardly against the rail. In such prior structure the cams have relatively small, fixed maximum throw which, to operate properly, require the wheel disc and various parts of the locking structure to be held to close dimensional tolerances, thereby adding to the cost of manufacture.

An object of this invention is to provide a simple, inexpensive and efficient locking structure for a variable tread wheel having sufficient range of adjustment to compensate for the ordinary dimensional variations of the wheel disc and rim. In the accompanying drawings.

Figure 1:
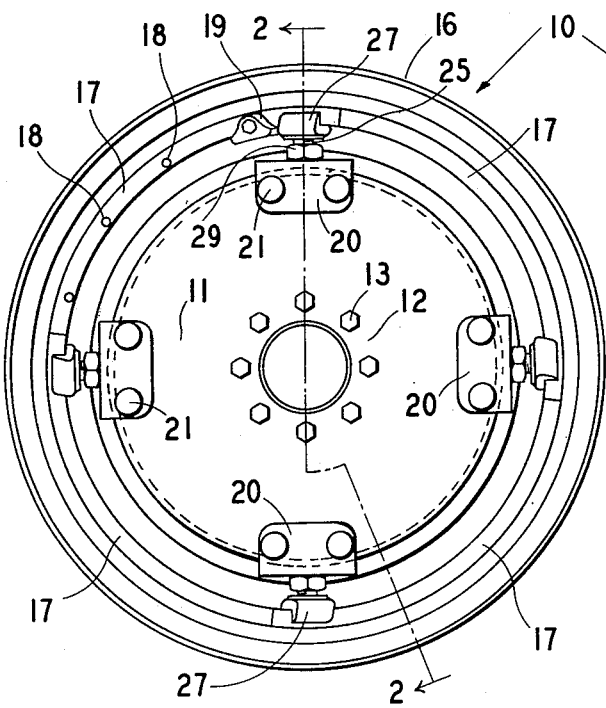
Fig. 1 is an elevational view of a wheel utilizing the device of this invention.
Figure 2:
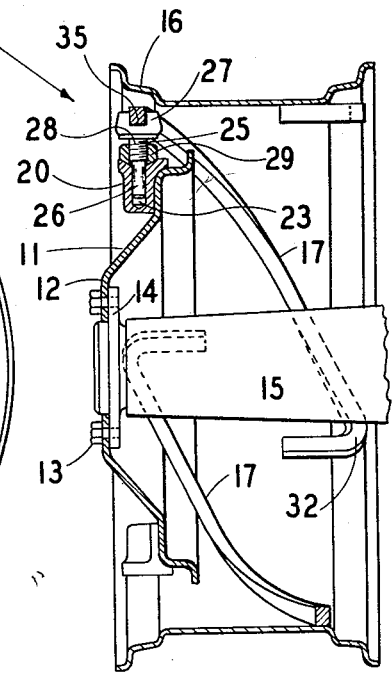
Fig. 2 is a sectional view taken on line 2—2 of Fig. 1.

Shown in the drawings is a wheel 10 having a disc or body 11 with a central bolting on flange 12 mounted by bolts 13 on the hub plate 14 of a power driven axle whose housing is shown at 15. Wheel 10 has a rim 16 with a number of helically shaped rails or tracks 17 secured as by welding to its inner surface. The ends of the rails 17 are turned axially as shown to provide stops and furnish reinforcement for the rail ends which project out beyond the rim. One of the rails has circumferentially arranged openings 18 for receiving bolts for securing one or more blocks 19 to the rail at various locations.

Figure 3:
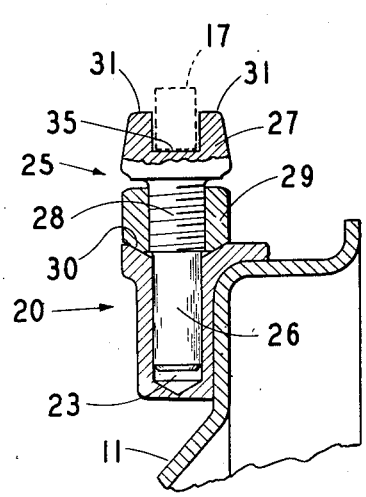
Fig. 3 is an enlarged sectional view of the device mounted on a wheel disc with a rail indicated in dotted lines.
Figure 4:
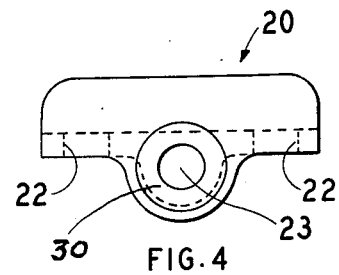
Fig. 4 is a top plan view of the bracket separate from the wheel.

At least three metal brackets 20, which may be cast or forged, are secured to a face of the wheel body 11 by such means as carriage bolts 21 extending through openings 22 (Fig. 4) in the brackets. Each bracket is shaped to fit the contour of the wheel body 11 (Fig. 3) and has a cylindrical opening 23 extending radially of the wheel.

Figure 5:
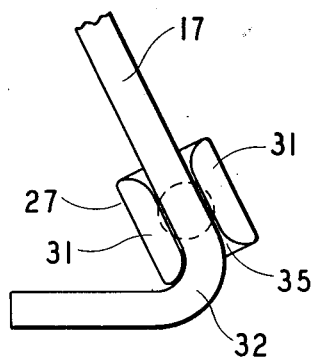
Fig. 5 illustrates the cooperation between the yoke portion of the device and a rail on the rim.

A jackscrew 25 has a cylindrical stem 26 which fits nicely within socket 23 in bracket 20 and has a bifurcated head 27 forming a yoke shaped to slidably fit a rail or track 17 on the rim of the wheel. Stem 26 swivels within socket 23, permitting the yoke 27 to turn and adjust itself to the angle of the rail 17. Stem 26 also shifts axially of the wheel in socket 23. An adjustment nut 29, which seats on the bracket 20, is screwed onto the threaded part 28 of the jackscrew. The seat portion 30 of the bracket and the mating portion of the nut 29 are preferably conically shaped as shown. The side walls 31 of yoke 27 are curved as shown in Fig. 5 to conform to the curvature of the inner face of the axially turned portions 32 of the rails 17.

In use rim 16 is assembled to wheel body 11 by bolting brackets 20 onto wheel body 11 with yokes 27 straddling rails 17. Jackscrews 25 are initially adjusted radially inwardly so that the rails 17 are freely slidable in the yokes 27. Assuming that the wheel is mounted on the hub 14 of a tractor axle, to adjust the tractor's tread width, the wheel body 11 and rim 16 are turned relatively to each other and the screw-like engagement of the yokes 27 with the helical rails 17 causes the rim to shift axially inwardly or outwardly. This may be done by holding rim 16 rotationally stationary and using the tractor engine to turn the wheel body 11.

When the tread width has been adjusted, the rim and wheel body are locked together by turning the nuts 29 to shift the elements 25 radially outwardly so that bottom surfaces 35 of the yokes 27 press against the rails 17 in a tight frictional engagement. The rails are thereby slightly expanded and tend to chord between consecutive yokes. Blocking bodies 19 are bolted onto one of the rails 17 on either side of the yoke 27 to supplement the frictional lock between the yokes and rails. When the rim 16 is in extreme inward or outward position as illustrated in Figs. 1 and 5, only one blocking body 19 is used, engagement of the yoke 27 with turned-in end portion 32 of the rail replacing the second blocking body.

To re-adjust the tread width the blocking bodies 19 are removed and the nuts 29 are turned to shift jackscrews 25 radially inwardly to disengage the surfaces 35 of the yokes 27 from the rails 17. The rim 16 and wheel body 11 are relatively turned to move the rim axially to the desired new position, the yokes are again locked against the rails 17, and the blocking bodies 19 are replaced.

It is important that each element 25 has a range of movement radially of the wheel equal to a substantial portion of the length of the threaded portion 28 of the element 25. This range of movement is sufficient to insure proper operation of the clamping device despite ordinary dimensional variations arising in manufacture of the wheel body 11, rim 16, rails 17 and the clamping device.

The engagement of the tapered surface on the nut 29 with the tapered seat 30 on the bracket 20 plus the nice fit of the relatively long cylindrical stem 26 of the element 25 in the recessed guideway 23 firmly supports the element 25 against lateral wobbling and thereby improves the torque carrying characteristics of the clamping device.

Figure 6:
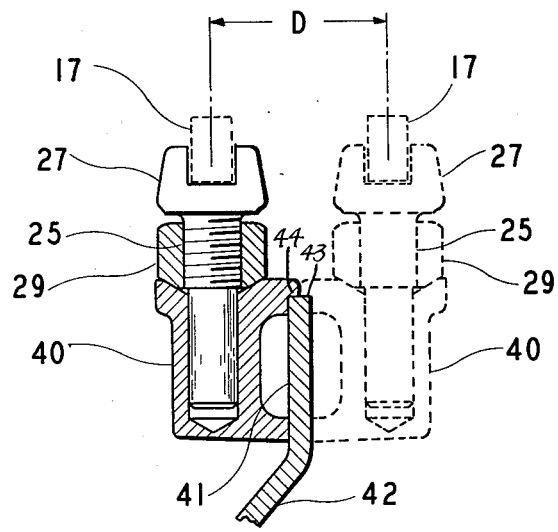
Fig. 6 shows a modified form of the invention.

Fig. 6 illustrates a form of the invention utilizing a bracket 40 which is similar to bracket 20 except that it is shaped to fit a flat region 41 of a wheel body 42. Region 41 of the wheel body has an unflanged outer edge 43 engaged by a shoulder portion 44 of bracket 40. The bracket 40 may be mounted either on the outer face of the wheel body as shown in solid lines or may be reversed and mounted on the inner face of the wheel body as shown in dotted lines. The range of axial adjustment of the rim 16 on the wheel body is thereby increased by the distance D which is twice the distance between the center lines of the element 25 and wheel body 42. The bracket 40 is arranged to be mounted on the wheel body 42 by means of bolts as shown at 21 in Fig. 1.

I claim:

1. A wheel of the type having a rim axially adjustable on the wheel body by interengagement of means on the wheel body with helical means on the rim, said means on the wheel body comprising, a plurality of brackets, means forming a generally cylindrical socket on each of said brackets, each of said brackets having a portion secured to a generally radially extending portion of the wheel body with said socket being axially displaced from said portion of the wheel body and extending generally radially of the wheel body, a jack screw having a portion adapted to engage the helical means on the rim of the wheel, said jack screw having a stem portion freely movably engaging in said socket but fitting nicely therein, a nut threaded onto each jack screw, each bracket having a bearing seat at its outer end supporting said nut, said nut being turnable to move said jack screw radially for clamping said portion thereof against the helical means on the wheel rim.

2. The wheel defined in claim 1 wherein each of said brackets has another portion supported generally radially by a generally axially extending portion of the wheel body.

3. A wheel of the type having a rim axially adjustable on the wheel body by interengagement of means on the wheel body with helical means on the rim, said means on the wheel body comprising, a plurality of brackets, each of said brackets having a socket therein, said socket having a substantially smooth cylindrical bearing surface, means securing said brackets on said body with said sockets extending in a generally radial direction, a jack screw for each of said brackets, said jack screw having a stem portion, said stem portion having a substantially smooth cylindrical bearing surface, said stem portion fitting nicely in said socket with said bearing surfaces in rotatable and slidable interengagement, said jack screw having a head portion adapted to engage the helical means on the rim of the wheel, said jack screw having a threaded portion between said head portion and said stem portion, a nut engaging said threaded portion and engaging a seat on said bracket so that said head portion can be moved radially for engaging and disengaging the helical means on the wheel rim by turning said nut, said nut and said seat having generally conical interengaging portions generally coaxial with said stem portion and said socket, whereby said interengaged conical portions and the interengaging smooth bearing surfaces of said stem and socket provide radial and circumferential support for said jack screw to facilitate transmitting torque to the wheel rim.

References Cited in the file of this patent

UNITED STATES PATENTS

| | | |
|---|---|---|
| 1,177,459 | Wagenhorst | Mar. 28, 1916 |
| 1,527,321 | McClellan | Feb. 24, 1925 |
| 1,880,641 | Woodward | Oct. 4, 1932 |
| 2,417,139 | Strehlow | Mar. 11, 1947 |